(12) United States Patent
Ueda et al.

(10) Patent No.: US 7,885,538 B2
(45) Date of Patent: *Feb. 8, 2011

(54) DIGITAL CAMERA

(75) Inventors: Hiroshi Ueda, Osaka (JP); Kaoru Mokunaka, Hyogo (JP); Kenji Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/652,173

(22) Filed: Jan. 5, 2010

(65) Prior Publication Data

US 2010/0103306 A1    Apr. 29, 2010

Related U.S. Application Data

(63) Continuation of application No. 11/764,516, filed on Jun. 18, 2007, now Pat. No. 7,668,456.

(30) Foreign Application Priority Data

Jun. 20, 2006    (JP) .............................. 2006-170040

(51) Int. Cl.
G03B 13/10    (2006.01)
(52) U.S. Cl. .................................. 396/380; 348/333.12
(58) Field of Classification Search ................. 396/296, 396/373, 378, 380, 436; 348/231.3, 333.02, 348/333.03, 333.09, 333.12, 341; 352/171
See application file for complete search history.

(56) References Cited

U.S. PATENT DOCUMENTS

| 2001/0026683 A1 | 10/2001 | Morimoto et al. |
| 2005/0117049 A1 | 6/2005 | Suzuki |
| 2005/0146631 A1 | 7/2005 | Shelton et al. |
| 2005/0174462 A1 | 8/2005 | Brost |

FOREIGN PATENT DOCUMENTS

JP    2001-272593    10/2001

*Primary Examiner*—Clayton E Laballe
*Assistant Examiner*—Autumn Parker
(74) *Attorney, Agent, or Firm*—Hamre, Schumann, Mueller & Larson, P.C.

(57) ABSTRACT

A digital camera in which a recording portion made up of a microcomputer 110 and a card slot 153 performs predetermined processing on image data generated by a CMOS sensor 130 so that the image data takes on the aspect ratio accepted via an operation portion 140 while in live view mode, or performs predetermined processing on the image data generated by the CMOS sensor 130 so that the image data takes on the aspect ratio of an optical viewfinder while in viewfinder mode. The image data is then stored in a memory card 300. Through this configuration, it is possible to provide a digital camera in which an image of a composition that suits the user's intent can be recorded, as well as in which the image can be recorded having an aspect ratio that the user desires, selected from among a plurality of aspect ratios.

4 Claims, 14 Drawing Sheets

Set to 4:3

Set to 3:2

Set to 16:9

Set to 3:2

Set to 4:3

DIGITAL CAMERA

This application is a continuation of U.S. application Ser. No. 11/764,516, filed Jun. 18, 2007, which application is incorporated herein by reference.

BACKGROUND OF THE INVENTION

1. Field of the Invention

The present invention relates to a digital camera, and particularly relates to a digital camera that includes a movable mirror and that allows a subject image to be viewed through a digital viewfinder.

2. Description of Related Art

Digital single-lens reflex cameras include an electronic viewfinder and an optical viewfinder, and thus it is possible to switch a subject image formed by an optical imaging system by a movable mirror and view the subject image through the optical viewfinder. Therefore, no inconsistencies arise between the recorded subject image and the subject image displayed in the optical viewfinder, and imaging operations thus can be performed in a satisfactory manner.

A digital single-lens reflex camera that includes a live view mode has been disclosed in, for example, Patent Reference 1 (JP 2001-272593A).

Meanwhile, technology that changes the aspect ratio of an image by changing the cutout range of the image data acquired from the imaging elements is being put into actual use. According to this technology, it is possible to record image data of various aspect ratios with a single imaging apparatus.

However, when recording image data of an aspect ratio different from the aspect ratio of the optical viewfinder is also allowed in a mode in which a shot is composed using the optical viewfinder, the image seen when composing the shot will differ from the image recorded, and thus image data that differs from what the user intended to capture will be recorded.

In order to prevent this from occurring, changing the aspect ratio of the optical viewfinder in accordance with the aspect ratio of the recorded image can be considered, but in order to implement such a scheme, it is necessary to provide an additional system for limiting the field of view of the optical viewfinder.

SUMMARY OF THE INVENTION

Therefore, with the foregoing in mind, it is an object of the present invention to provide a digital camera that: includes a movable mirror, and also can perform a live view display of the subject image via an electronic viewfinder; can record images of a composition that matches a user's intent using a simple system; and can record images of an aspect ratio chosen from among a plurality of aspect ratios by the user.

The digital camera according to the present invention has a movable mirror arranged so as to be able to advance into and withdraw from the optical path of an optical imaging system in order to conduct a subject image to an optical viewfinder, and comprises: an imaging element that captures a subject image formed by the optical imaging system and generates image data; a display portion that displays the image based on the generated image data; a control portion having a live view mode, in which control is performed so that the image based on the generated image data is displayed in the display portion in real time as a moving picture, and a viewfinder mode, in which control is performed so that the movable mirror conducts the subject image to the optical viewfinder; an aspect ratio accepting portion that accepts an instruction regarding the aspect ratio of an image; and a recording portion that performs, during the live view mode, predetermined processing on the image data generated by the imaging element so that the image data takes on the aspect ratio accepted by the aspect ratio accepting portion and stores the image data in a storage medium, and performs, during the viewfinder mode, predetermined processing on the image data generated by the imaging element so that the image data takes on the aspect ratio of the optical viewfinder and stores the image data in the storage medium.

Through this, it is possible, during live view mode, to record an image of an aspect ratio selected by a user from among a plurality of aspect ratios. Because the aspect ratio of the image for recording is changed using image processing technology, this can be implemented without the need for a special mechanism. Meanwhile, during viewfinder mode, only an image of the aspect ratio of the optical viewfinder is recorded, and thus the aspect ratio of the image displayed in the optical viewfinder and the aspect ratio of the image for recording easily can be made to match. Accordingly, it is possible to record an image of a composition that matches the user's intent using a simple mechanism.

Therefore, according to this embodiment of the invention, it is possible to provide a digital camera that can record an image having a composition that matches the user's intent using a simple system, and can record images of an aspect ratio chosen from among a plurality of aspect ratios by the user.

In this case, the aspect ratio accepting portion may be configured so as to not accept instructions regarding the aspect ratio of the image during the viewfinder mode. Through this, it is possible easily to alert the user that the aspect ratio cannot be changed during viewfinder mode. Furthermore, the value set for the aspect ratio in live view mode is not changed while in viewfinder mode, and therefore it is possible to record image data using the previous settings when returning to live view mode.

Moreover, when moving from the live view mode to the viewfinder mode, the recording portion may switch from a state in which image data of the aspect ratio accepted by the aspect ratio accepting portion is recordable to a state in which image data of the aspect ratio of the optical viewfinder is recordable. Through this, it is possible automatically to cause the aspect ratios of the displayed image and the recorded image to match, even without the user being aware that the matching takes place.

Moreover, when moving from the viewfinder mode to the live view mode, the recording portion may switch from a state in which image data of the aspect ratio of the optical viewfinder is recordable to a state in which image data of the aspect ratio accepted by the aspect ratio accepting portion before moving from the live view mode to the viewfinder mode is recordable. Through this, the aspect ratio previously set in live view mode can be maintained when returning to live view mode from viewfinder mode, and therefore it is possible to prevent an aspect ratio switch the user does not intent to occur.

According to the present invention as described above, it is possible to provide a digital camera that can record an image having a composition that matches the user's intent using a simple system, and can record images of an aspect ratio from among a plurality of aspect ratios selected by the user.

DETAILED DESCRIPTION OF THE INVENTION

Hereinafter, the present invention will be described by way of an illustrative embodiment with reference to the drawings.

1. Configuration of the Digital Camera

Hereinafter, the configuration of a camera 10 according to an embodiment of the present invention shall be described with reference to FIGS. 1 through 6.

[1-1. Outline of the Overall Configuration]

Figure 1:
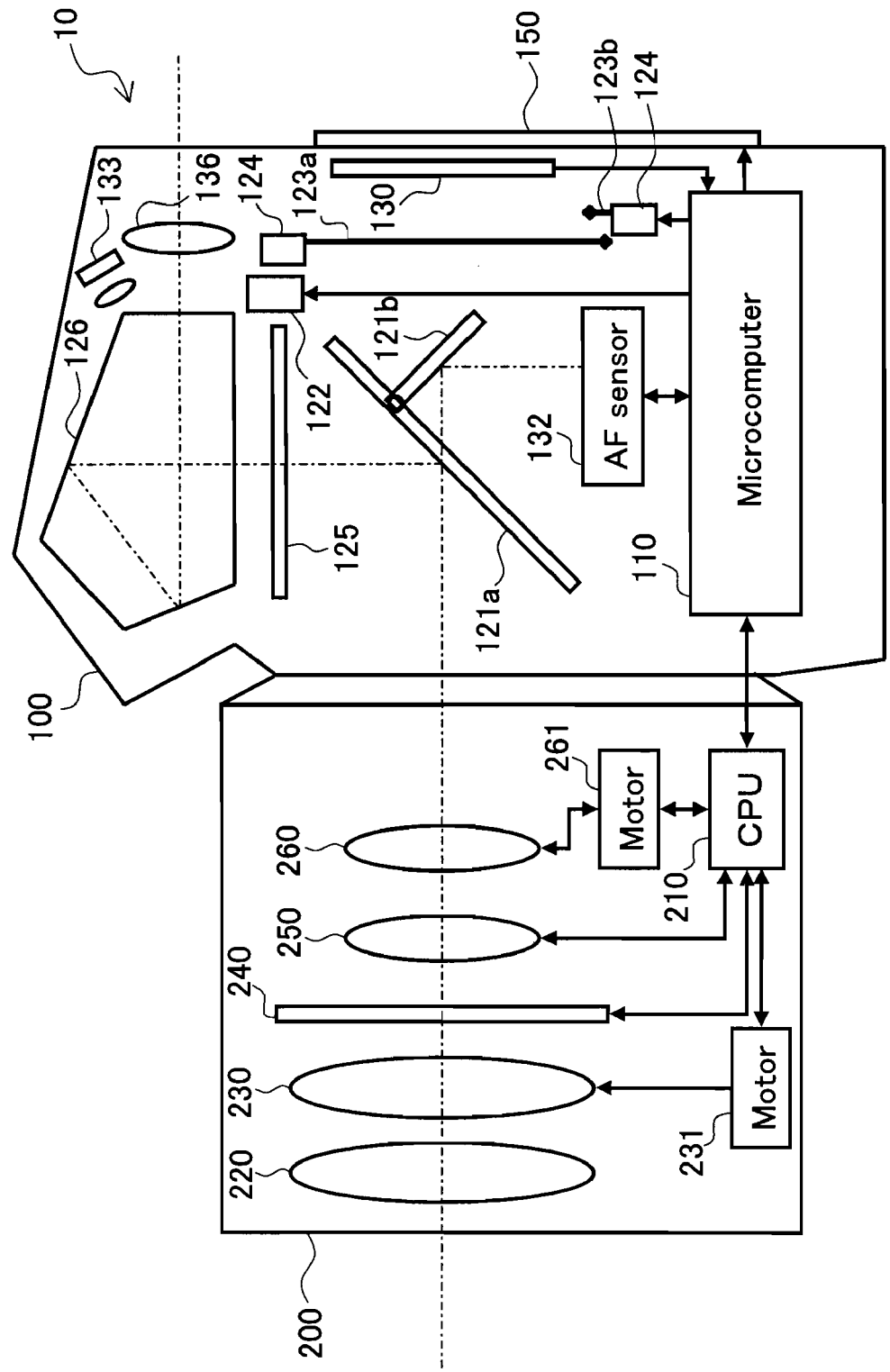
FIG. 1 is a schematic view showing an outline of a camera according to an embodiment of the present invention.

FIG. 1 is a schematic view showing an outline of the camera 10. The camera 10 is configured of a camera body 100 and an interchangeable lens 200, which can be attached/detached to/from the camera body 100.

The camera body 100 captures a subject image collected through an optical system included within the interchangeable lens 200, and records this as image data. The camera body 100 includes a mirror box 120 (see FIG. 2). The mirror box 120 switches the optical path of the optical signal from the optical system included in the interchangeable lens 200 in order to pass light of the subject image selectively into either of a Complementary Metal-Oxide Semiconductor (CMOS) sensor 130 or an eyepiece 136. The mirror box 120 includes movable mirrors 121a and 121b, a mirror driving portion 122, a shutter 123, a shutter driving portion 124, a focusing glass 125, and a prism 126.

The movable mirror 121a is arranged so as to be able to advance into and withdraw from the optical path of the optical imaging system in order to conduct the subject image to the optical viewfinder. The movable mirror 121b is arranged so as to be able to advance into and withdraw from the optical path of the optical imaging system along with the movable mirror 121a. The movable mirror 121b reflects part of the optical signal inputted from the optical system included in the interchangeable lens 200 into an Auto Focus (AF) sensor 132.

While the movable mirror 121a is advanced into the optical path of the optical imaging system, part of the optical signal inputted from the optical system included in the interchangeable lens 200 enters the eyepiece 136 via the focusing glass 125 and the prism 126. Furthermore, the optical signal reflected by the movable mirror 121a is diffused by the focusing glass 125. Then, part of the diffused optical signal enters an auto exposure (AE) sensor 133. On the other hand, while the movable mirrors 121a and 121b are withdrawn from the optical path of the optical imaging system, the optical signal inputted from the optical system included in the interchangeable lens 200 enters the CMOS sensor 130.

The mirror driving portion 122 is composed of mechanical components such as motors, springs, and the like, and drives the movable mirrors 121a and 121b based on control performed by a microcomputer 110.

The shutters 123a and 123b switch between blocking the optical signal acquired from the interchangeable lens 200 and allowing the optical signal to pass. The shutter driving portion 124 is composed of mechanical components such as motors, springs, and the like, and drives the shutters 123a and 123b based on control performed by the microcomputer 110. It should be noted that the motors included in the mirror driving portion 122 and the shutter driving portion 124 may be different motors, or may be a single dual-purpose motor.

A liquid crystal monitor 150 is provided on the rear side of the camera body 100. The liquid crystal monitor 150 is capable of displaying image based on image data generated by the CMOS sensor 130, or image based on image data which the image data generated by the CMOS sensor 130 is subjected to a predetermined processing.

The optical system included in the interchangeable lens 200 includes an objective lens 220, a zoom lens 230, a diaphragm 240, an image stabilization unit 250, and a focus lens 260. A CPU 210 controls this optical system. The CPU 210 is capable of transmitting/receiving a control signal and information regarding the optical system to/from the microcomputer 110 in the camera body 100.

[1-2. Configuration of the Camera Body]

Figure 2:
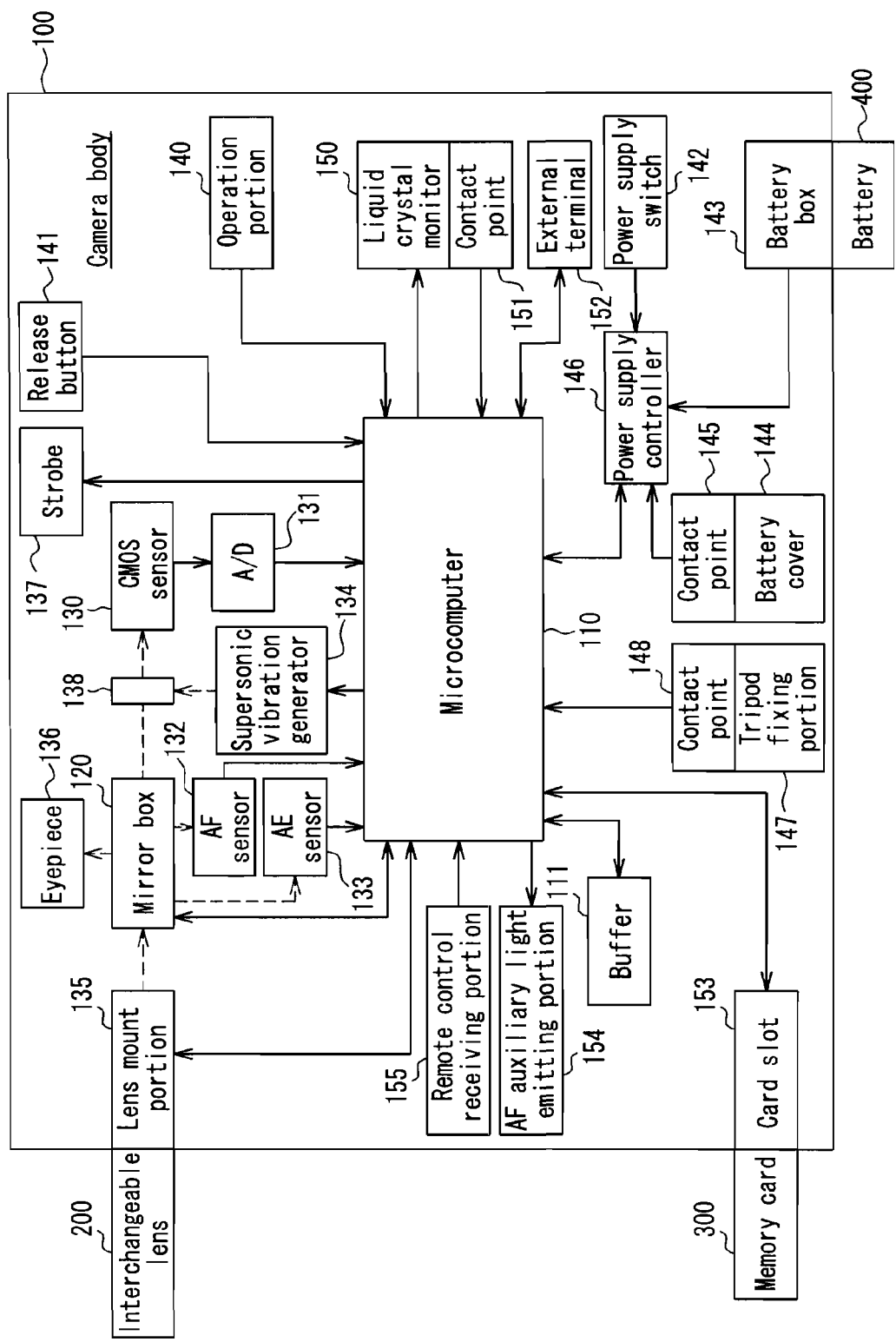
FIG. 2 is a block diagram showing the structure of a camera body according to an embodiment of the present invention.

FIG. 2 is a block diagram showing the configuration of the camera body 100. As shown in FIG. 2, the camera body 100 has a number of portions, and is configured so that the microcomputer 110 controls those portions. However, although the present embodiment describes the microcomputer 110 as controlling the entire camera body 100, it should be noted that control of the camera body 100 may be carried out by a plurality of control portions.

A lens mount portion 135 is a member that the interchangeable lens 200 attaches to or detaches from. The lens mount portion 135 is electrically connectable to the interchangeable lens 200 via a connection terminal or the like, and is also mechanically connectable via a mechanical member such as a latch or the like. The lens mount portion 135 is capable of outputting a signal from the interchangeable lens 200 to the microcomputer 110, and is capable of outputting a signal from the microcomputer 110 to the interchangeable lens 200. The lens mount portion 135 has a hollow structure. For this reason, the optical signal from the optical system included in the interchangeable lens 200 passes through the lens mount portion 135 and reaches the mirror box 120.

The mirror box 120 conducts the optical signal that has passed through the lens mount portion 135 to the CMOS sensor 130, the eyepiece 136, the AF sensor 132, and the AE sensor 133, in accordance with the internal state of the mirror box 120. Switching of the optical signal by the mirror box shall be described in the section "1-4. State of the Mirror Box".

The CMOS sensor 130 converts the optical signal that has passed through the mirror box 120 and entered the CMOS sensor 130 into an electrical signal and generates image data. The generated image data is converted from an analog signal to a digital signal by an A/D converter 131 and is outputted to the microcomputer 110. Note that predetermined image processing may be performed while the generated image data is outputted and en route from the CMOS sensor 130 to the A/D converter 131, while the image data is outputted and en route from the A/D converter 131 to the microcomputer 110, and so on.

The eyepiece 136 transmits the optical signal that has passed through the mirror box 120. At this time, in the mirror box 120, the optical signal that entered from the interchangeable lens 200 is reflected by the movable mirror 121a, and the subject image is formed on the focusing glass 125, as shown in FIG. 1. Then, the prism 126 reflects this subject image and emits the resultant to the eyepiece 136. Accordingly, the user can view the subject image emitted from the mirror box 120. Here, the eyepiece 136 may be configured of a single lens, or may be configured of a lens group made up of a plurality of lenses. In addition, the eyepiece 136 may be held in a fixed position in the camera body 100, or may be held in a mobile position for purposes of diopter adjustment or the like. The optical viewfinder, which is configured of the focusing glass 125, the prism 126, and the eyepiece 136, is optimized for displaying images with compositions that utilize a 4:3 aspect ratio. However, the optical viewfinder may be optimized for displaying images with compositions that utilize other aspect ratios. For example, the optical viewfinder may be optimized for displaying images with compositions that utilize a 16:9 aspect ratio, and may be optimized for displaying images with compositions that utilize a 3:2 aspect ratio.

A protective material 138 protects the surface of the CMOS sensor 130. By providing the protective material 138 on the front side of the CMOS sensor 130, it is possible to prevent foreign objects such as dust from collecting on the surface of the CMOS sensor 130. The protective material 138 may be formed of a transparent material such as glass or plastic.

An supersonic vibration generator 134 is activated in response to a signal from the microcomputer 110, and generates supersonic vibrations. The supersonic vibrations generated by the supersonic vibration generator 134 are transmitted to the protective material 138. As a result, the protective material 138 vibrates, making it possible to shake off foreign objects, such as dust, which have collected on the protective material 138.

The supersonic vibration generator 134 can be realized by, for example, attaching a piezoelectric element to the protective material 138. In such a case, the piezoelectric element attached to the protective material 138 can be caused to vibrate by supplying an alternating current to the piezoelectric element.

A strobe 137 emits light in accordance with an instruction from the microcomputer 110. The strobe 137 may be built into the camera body 100, or may be an attachable/detachable type. In the case of an attachable/detachable type flash, it is necessary to provide a flash mounting portion, such as a hot shoe, in the camera body 100.

A release button 141 accepts instructions regarding autofocus operations, photometric operations, and the like from the user, as well as accepting instructions regarding the commencement of capturing of the image for recording by the CMOS sensor 130 from the user. The release button 141 is compatible with operations in which the button is depressed halfway, and operations in which the button is depressed fully. When the release button 141 is depressed halfway by the user while in autofocus mode, the microcomputer 110 instructs the interchangeable lens 200 to perform autofocus operations based on a signal from the AF sensor 132. In addition, when the release button 141 is depressed halfway by the user while in an automatic exposure mode, the microcomputer 110 instructs the interchangeable lens 200 to perform photometric automatic exposure operations based on a signal from the AE sensor 133. However, when the release button 141 is fully depressed by the user, the microcomputer 110 controls the mirror box 120, the CMOS sensor 130, and the like, and captures the image for recording. Then, the microcomputer 110 performs YC conversion, resolution conversion, compression and the like as necessary on the captured image for recording, thereby generating image data for recording. The microcomputer 110 stores the generated image data for recording in a memory card 300 via a card slot 153. In order to provide the release button 141 with functionality for halfway depression operation and full depression operation, two switches, for example, can be built into the release button 141. In such a case, one of the switches is turned on when the release button 141 is depressed halfway, and the other switch is turned on when the release button 141 is depressed fully.

Figure 3:
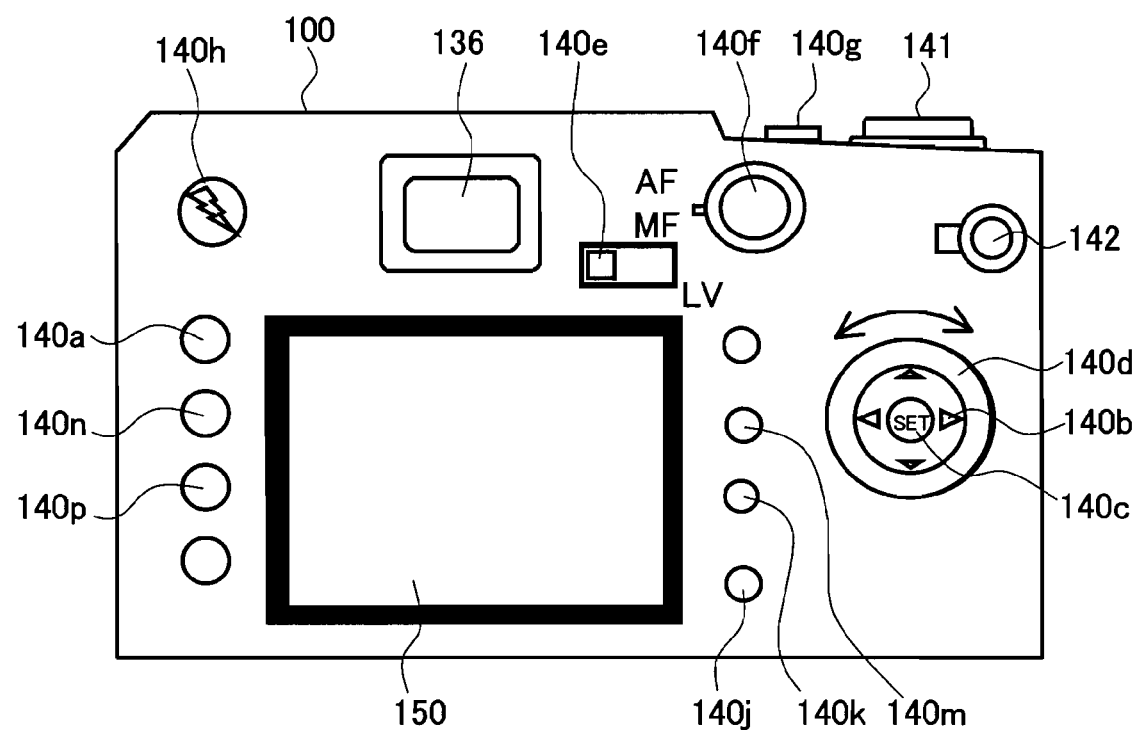
FIG. 3 is a rear view of the camera body according to an embodiment of the present invention.

An operation portion 140 is a member that transmits various instructions from the user to the microcomputer 110. A rear view of the camera body 100 is shown in FIG. 3 for the purpose of illustrating various operation members. The rear side of the camera body 100 includes a menu button 140a, a directional pad 140b, a set button 140c, a rotary dial 140d, a viewfinder select switch 140e, a focus mode select switch 140f, a flash activation switch 140h, an LV preview button 140j, a depth-of-field preview button 140k, an AV button 140m, and a power supply switch 142. An image stabilization mode select button 140g and the release button 141 are provided on the top surface of the camera body 100.

The menu button 140a causes setting information of the camera 10 to be displayed in the liquid crystal monitor 150, and is a button that makes it possible for the user to change the settings. The directional pad 140b is a button for selecting various settings, items, images, and the like displayed in the liquid crystal monitor 150, and can, for example, cause a cursor or the like to move. The set button 140c is a button for confirming the various settings, items, images, and the like displayed in the liquid crystal monitor 150 after those settings, items, images, and the like have been selected. The rotary dial 140d is an operational member that, like the directional pad 140b, selects various settings, items, images, and the like displayed in the liquid crystal monitor 150, and can, for example, cause a cursor to move by being rotated. The viewfinder select switch 140e is a switch for selecting whether to display a captured image in the eyepiece 136 or the liquid crystal monitor 150. The focus mode select switch 140f is a switch for selecting whether to set the focus mode to manual focus mode or autofocus mode. The image stabilization mode select button 140g is a switch for selecting whether or not to use image stabilization, and for selecting which image stabilization mode to use. The depth-of-field preview button 140k is a button for adjusting the aperture in live view mode. The LV preview button 140j is a button that adjusts the aperture as well as enlarges part of the image displayed in the liquid crystal monitor 150, while in live view mode. The AV button 140m is a button for adjusting the aperture in OVF mode.

Returning to FIG. 2, the liquid crystal monitor 150 receives a signal from the microcomputer 110 and displays images, information of various settings, and the like. The liquid crystal monitor 150 can display an image based on the image data generated by the CMOS sensor 130, or an image based on the image data in which the image data generated by the CMOS sensor 130 is subjected to a predetermined processing. The liquid crystal monitor 150 can display an image obtained when the microcomputer 110 performs a predetermined processing, such as expansion, as necessary on the image data held in the memory card 300. The liquid crystal monitor 150 is provided, as shown in FIG. 3, on the rear surface of the camera body 100. The liquid crystal monitor 150 is provided on the camera body 100 so as to be rotatable. A contact point 151 detects rotation of the liquid crystal monitor 150. The liquid crystal monitor 150 is optimal for displaying images having a composition in a 4:3 aspect ratio. However, through control performed by the microcomputer 110, the liquid crystal monitor 150 is capable of displaying images having compositions in other aspect ratios (for example, 3:2 and 16:9).

An external terminal 152 is a terminal for outputting image data, various setting information, and the like to an external device. The external terminal 152 is, for example, a Universal Serial Bus (USB) terminal, a terminal for an interface pursuant to an Institute of Electrical and Electronic Engineers (IEEE 1394) specification, or the like. In addition, when a connection terminal from an external device connects to the external terminal 152, the external terminal 152 notifies the microcomputer 110 of the connection.

A power supply controller 146 controls the members within the camera 10, such as the microcomputer 100, by supplying power from a battery 400, which is housed in a battery box 143, to those members. The power supply controller 146 starts supplying power from the battery 400 to the members within the camera 10 when the power supply switch 142 is turned on. In addition, the power supply controller 146 includes a sleep function; when the power of the camera 10 is on and no operations are performed for a predetermined length of time, the power supply controller 146 stops the supply of power to the members within the camera 10, with the exception of some members. Furthermore, the power supply controller 146 notifies the microcomputer 110 that a battery cover 144 has been opened based on a signal from a contact point 145 that monitors the opening/closing of the battery cover 144. The battery cover 144 is a member that allows the opening of the battery box 143 to open and close. The power supply controller 146 is configured so as to supply power to the various members within the camera 10 through the microcomputer 110, as shown in FIG. 2; however, the power supply controller 146 may be configured so as to supply power directly, as necessary.

A tripod fixing portion 147 is a member for fixing a tripod (not shown) to the camera body 100, and is configured of a screw or the like. A contact point 148 monitors whether or not a tripod has been attached to the tripod fixing portion 147, and notifies this to the microcomputer 110. The contact point 148 can be configured of a switch or the like.

The card slot 153 is a connector for mounting the memory card 300. The card slot 153 may be configured so as to include a control portion for controlling the memory card 300 and/or software, rather than simply having a mechanical structure for mounting the memory card 300.

A buffer 111 is a memory device used when the microcomputer 110 processes signals. The data temporarily stored in the buffer 111 is mainly image data, but control signals and the like also may be stored in the buffer 111. The buffer 111 may be any means capable of storage, such as Dynamic Random Access Memory (DRAM), Static Random Access Memory (SRAM), flash memory, ferroelectric memory, or the like. The buffer 111 may also be a specialized memory for storing images. In addition, the aspect ratio set by the user also is stored in the buffer 111. During live view mode, the microcomputer 110 processes the image data so as to take on the aspect ratio stored in the buffer 111, and generates image data for display and image data for recording. On the other hand, during OVF mode, the microcomputer 110 processes the image data so as to take on the aspect ratio of the optical viewfinder regardless of the aspect ratio stored in the buffer 111, and generates image data for display and image data for recording.

An AF auxiliary light emitting portion 154 is a member that emits auxiliary light when performing autofocus operation in a dark environment. The AF auxiliary light emitting portion 154 emits light based on control performed by the microcomputer 110. The AF auxiliary light emitting portion 154 includes a red light-emitting diode (LED).

A remote control receiving portion 155 is a receiving portion that receives a signal from a remote controller (not shown) and transmits the received signal to the microcomputer 110. The remote control receiving portion 155 typically includes a light-receiving element that receives infrared light from the remote controller.

[1-3. Configuration of the Interchangeable Lens]

Figure 4:
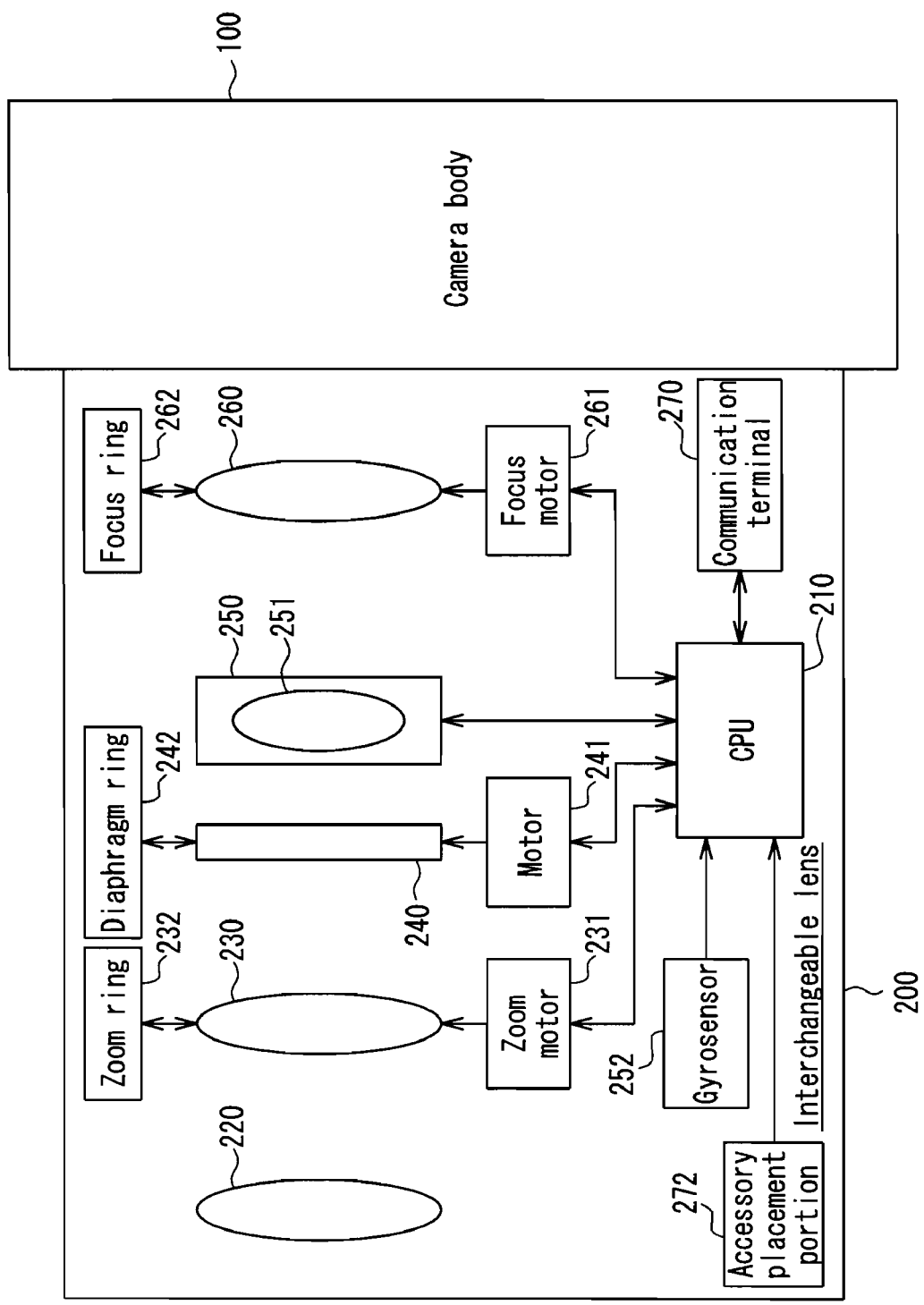
FIG. 4 is a block diagram showing the structure of an interchangeable lens according to an embodiment of the present invention.

FIG. 4 is a block diagram showing a configuration of the interchangeable lens 200. The interchangeable lens 200 has an optical imaging system, and is configured so that the optical imaging system is controlled by the CPU 210.

The CPU 210 controls the optical imaging system by controlling the actuator operations of a zoom motor 231, a diaphragm motor 241, an image stabilization unit 250, a focus motor 261, and the like. The CPU 210 sends information that indicates the status of the optical imaging system, an accessory placement portion 272, and the like to the camera body 100 via a communication terminal 270. In addition, the CPU 210 receives control signals and the like from the camera body 100, and controls the optical imaging system and the like based on the received control signals.

The objective lens 220 is a lens positioned closest to the subject. The objective lens 220 may be movable along the optical axis, or may be in a fixed position.

The zoom lens 230 is positioned further toward the image surface side than the objective lens 220. The zoom lens 230 is movable along the optical axis. It is possible to change the magnification of the subject image by moving the zoom lens 230. The zoom lens 230 is driven by the zoom motor 231. The zoom motor 231 may be a stepper motor, a servo motor, or the like; any motor may be used as long as it can drive the zoom lens 230. The CPU 210 monitors the position of the zoom lens 230 by monitoring the status of the zoom motor 231 or the status of other members.

The diaphragm 240 is positioned further toward the image surface side than the zoom lens 230. The diaphragm 240 has an aperture centered on the optical axis. The aperture can be changed through the diaphragm motor 241 and a diaphragm ring 242. The diaphragm motor 241 runs in tandem with the mechanism for changing the aperture size of the diaphragm, and can change the aperture size of the diaphragm by driving this mechanism. In the same manner, the diaphragm ring 242 runs in tandem with the mechanism for changing the aperture size of the diaphragm, and can change the aperture size of the diaphragm by driving this mechanism. The diaphragm motor 241 is provided with an electric control signal by the microcomputer 110 or the CPU 210 via the user, and operates in accordance with this control signal. On the other hand, the diaphragm ring 242 accepts mechanical operation from the user, and transmits this operation to the diaphragm 240. Furthermore, it is possible for the CPU 210 to detect whether or not the diaphragm ring 242 has been operated.

The image stabilization unit 250 is positioned further toward the image surface side than the diaphragm 240. The image stabilization unit 250 includes a stabilization lens 251 for image stabilization and an actuator for driving the stabilization lens 251. The actuator included in the image stabilization unit 250 can move the stabilization lens 251 on a plane orthogonal to the optical axis. A gyrosensor 252 measures the angular velocity of the interchangeable lens 200. For the sake of simplicity, the gyrosensor 252 is denoted as a single block in FIG. 4, but the interchangeable lens 200 actually includes two gyrosensors 252. One of the gyrosensors measures the angular velocity relative to the vertical axis of the camera 10. The other gyrosensor measures the angular velocity relative to the horizontal axis of the camera 10, which is perpendicular to the optical axis. The CPU 210 measures the amount and direction of the movement of the interchangeable lens based on angular velocity information obtained from the gyrosensors 252. Then, the CPU 210 controls the actuator to move the stabilization lens 251 in the direction that cancels out that amount of movement. Through this, the subject image formed by the optical imaging system of the interchangeable lens 200 is stabilized.

A focus lens 260 is positioned furthest toward the image surface side. The focus motor 261 drives the focus lens 260 along the optical axis. Through this, the focus of the subject image can be adjusted.

The accessory placement portion 272 is a member for attaching an accessory such as a lens hood to the front end of the interchangeable lens 200. The accessory placement portion 272 is configured of a mechanism such as a screw, a bayonet, or the like. Furthermore, the accessory placement portion 272 includes a detection device for detecting whether or not an accessory is attached. When an accessory is attached, the accessory placement portion 272 notifies this to the CPU 210.

[1-4. State of the Mirror Box]

The internal state of the mirror box 120 during various stages of operation shall be described with reference to FIGS. 1, 5, and 6.

FIG. 1 is a schematic view showing an internal state of the mirror box 120 during a mode in which the subject image is being viewed using the optical viewfinder. For the sake of simplicity, this state shall be referred to as "state A" in this specification. In state A, the movable mirrors 121a and 121b advance into the optical path of the optical signal entering from the interchangeable lens 200. For this reason, part of the optical signal from the interchangeable lens 200 is reflected by the movable mirror 121a, while the remainder of the optical signal is allowed to pass. The reflected optical signal passes through the focusing glass 125, the prism 126, and the eyepiece 136, and reaches the user's eyes. Furthermore, the optical signal reflected by the movable mirror 121a is reflected by the focusing glass 125, and part of the reflected signal passes into the AE sensor 133. On the other hand, part of the optical signal that penetrates the movable mirror 121a is reflected by the movable mirror 121b, and reaches the AF sensor 132. In addition, in state A, a first shutter 123a is closed. For this reason, the optical signal from the interchangeable lens 200 does not reach the CMOS sensor 130. Therefore, while it is possible to view the subject image using the optical viewfinder, perform autofocus operations using the AF sensor 132, and perform photometric operations using the AE sensor 133 while in state A, it is not possible to view the subject image using the liquid crystal monitor 150, record the image data generated by the CMOS sensor 130, and perform autofocus operations using the contrast of the image data generated by the CMOS sensor 130 while in state A.

Figure 5:
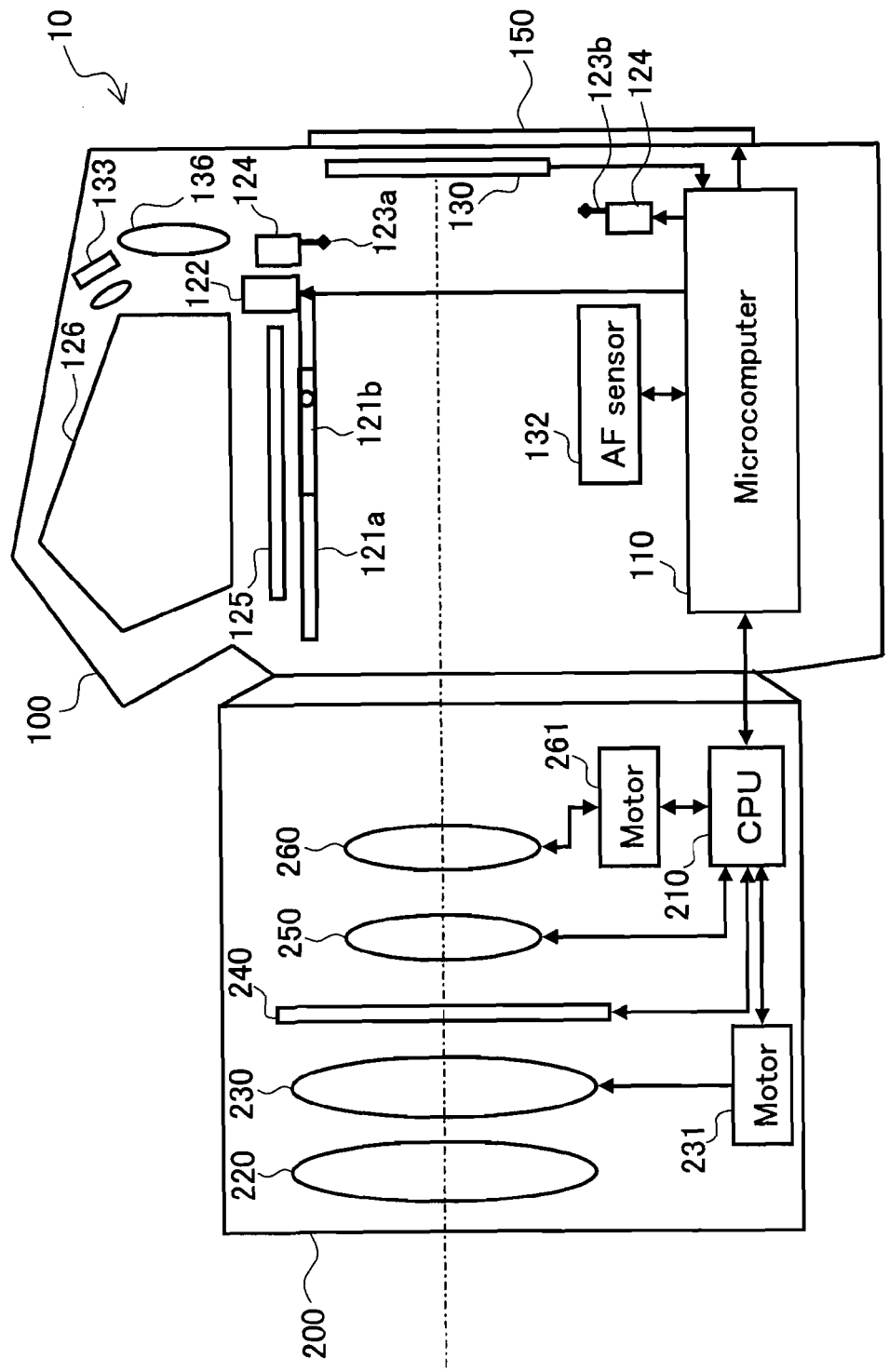
FIG. 5 is a schematic view showing the interior of a mirror box of the camera according to an embodiment of the present invention when the interior is in a state B.

FIG. 5 is a schematic view showing an internal state of the mirror box 120 during a mode in which the subject image is inputted into the CMOS sensor 130. For the sake of simplicity, this state shall be referred to as "state B" in this specification. In state B, the movable mirrors 121a and 121b withdraw from the optical path of the optical signal entering from the interchangeable lens 200. For this reason, the optical signal from the interchangeable lens 200 does not pass through the focusing glass 125, the prism 126, and the eyepiece 136, and does not reach the user's eyes, and furthermore does not reach the AF sensor 132 or the AE sensor 133. In state B, the first shutter 123a and a second shutter 123b are open. For this reason, the optical signal from the interchangeable lens 200 reaches the CMOS sensor 130. Therefore, as opposed to state A, it is possible to view the subject image using the liquid crystal monitor 150, record the image data generated by the CMOS sensor 130, and perform autofocus operations using the contrast of the image data generated by the CMOS sensor 130 while in state B; however, it is not possible to view the subject image using the optical viewfinder, perform autofocus operations using the AF sensor 132, and perform photometric operations using the AE sensor 133 while in state B. Note that the movable mirrors 121a and 121b and the first shutter 123a are energized so as to move from state A to state B, through an energizing portion such as a spring or the like. For this reason, it is possible to move from state A to state B substantially instantly, which is optimal for commencing exposure.

Figure 6:
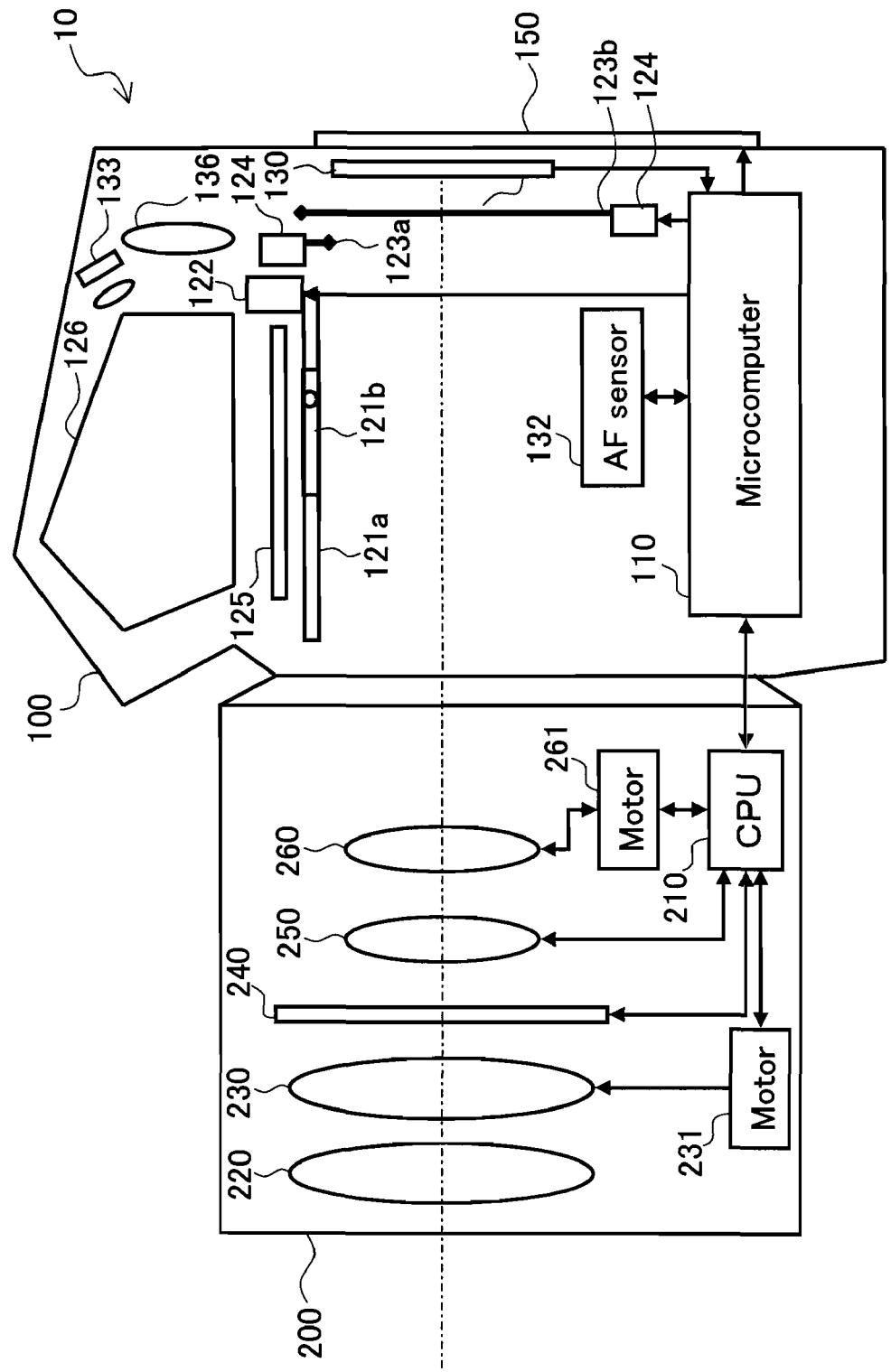
FIG. 6 is a schematic view showing the interior of the mirror box of the camera according to an embodiment of the present invention when the interior is in a state C.

FIG. 6 is a schematic view showing an internal state of the mirror box 120 immediately after exposure of the subject image to the CMOS sensor 130 has finished. For the sake of simplicity, this state shall be referred to as "state C" in this specification. In state C, the movable mirrors 121a and 121b withdraw from the optical path of the optical signal inputted from the interchangeable lens 200. For this reason, the optical signal from the interchangeable lens 200 does not pass through the focusing glass 125, the prism 126, and the eyepiece 136, and does not reach the user's eyes, and furthermore does not reach the AF sensor 132 or the AE sensor 133. Furthermore, in state C, the first shutter 123a is open, and the second shutter 123b is closed. For this reason, the optical signal from the interchangeable lens 200 does not reach the CMOS sensor 130. Therefore, it is not possible to view the subject image using the liquid crystal monitor 150, record the image data generated by the CMOS sensor 130, perform autofocus operations using the contrast of the image data generated by the CMOS sensor 130, view the subject image using the optical viewfinder, perform autofocus operations using the AF sensor 132, and perform photometric operations using the AE sensor 133 while in state C. The second shutter 123b is energized in the closing direction, and thus it is possible to move from state B to state C substantially instantly. For this reason, state C is an optimal state for ending the exposure to the CMOS sensor 130.

As described above, the camera 10 moves directly from state A to state B. However, due to the structural constraints of the mirror box 120, it is not possible to move from state B to state A without passing through state C. However, as this is a technical problem stemming from the mechanism of the mirror box 120, a mechanism may be employed in which it is possible to move directly from state B to state A without passing through state C.

[1-5. Corresponding Elements Between the Configuration of the Present Embodiment and the Configuration of the Present Invention]

A configuration that includes the focusing glass 125, the prism 126, and the eyepiece 136 is one example of the optical viewfinder of the present invention. The optical system that includes the objective lens 220, the zoom lens 230, the corrective lens 251, and the focus lens 260 is one example of the optical imaging system of the present invention. The movable mirrors 121a and 121b are examples of the movable mirrors of the present invention. The CMOS sensor 130 is an example of the imaging element of the present invention. The liquid crystal monitor 150 is an example of the display portion of the present invention. The microcomputer 110 is an example of the control portion of the present invention. In this case, the CPU 210 may be included as the control portion in addition to the microcomputer 110. The buffer 111 is an example of the storage portion of the present invention. The operational portion including the menu button 140a, the directional pad 140b, the set button 140c, and so on is an example of the aspect ratio accepting portion of the present invention. The configuration made up of the microcomputer 110 and the card slot 153 is an example of the recording portion of the present invention. The memory card 300 is an example of the storage medium of the present invention.

2. Operation of the Digital Camera

Operation of the camera 10 according to the present embodiment of the present invention configured in the manner described above shall be explained hereafter with reference to FIGS. 7 to 14.

[2-1. Operation for Displaying an Image in Real Time]

Display operation performed so that a subject image formed by the interchangeable lens 200 can be viewed in real time shall be described hereafter. Two operations are set as this display operation. The first operation utilizes the optical viewfinder, while the second operation utilizes the liquid crystal monitor 150. These operations each shall be described in detail hereafter.

Note that in the present specification, the function and display for displaying the subject image in the liquid crystal monitor 150 in real time are referred to as "live view". In addition, the control mode of the microcomputer 110 during the live view operation is referred to as "live view mode".

Live view is not particularly limited as long as it displays the subject image in the liquid crystal monitor 150 in real time; the image data displayed in the liquid crystal monitor 150 may or may not be stored in a storage portion such as the memory card 300 at this time.

In addition, while live view is being displayed, it is necessary to allow the optical signal from the interchangeable lens 200 to reach the CMOS sensor 130, and thus it is necessary for the internal state of the mirror box 120 to be in state B, as shown in FIG. 5. However, it is necessary for the internal state of the mirror box 120 to be put in states other than state B, such as state A and state C, in accordance with other various states such as imaging operation, autofocus operation, automatic exposure control operation, and so on; thus, periods arise in which the liquid crystal monitor 150 cannot perform the live view display even when the microcomputer 110 is set to live view mode.

Furthermore, as mentioned above, "live view" refers to displaying the subject image in the liquid crystal monitor 150 in real time; however, the term "real time" should not be taken literally. A slight time delay between movement in the display and the actual movement of the subject may be present as long as the user essentially feels that the display is in real time. It is thought that the liquid crystal monitor 150 normally operates the live view display with a time delay of approximately 0.1 seconds (depending on the hardware and the like of the camera 10, this may be slightly longer or shorter); however, a delay of 1 to 5 seconds also may be included in the concept of live view display as real-time display of the subject.

[2-1-1. Operation During Use of the Optical Viewfinder]

The user can switch between live view mode and optical viewfinder mode (called OVF mode hereafter for the sake of simplicity) by sliding the viewfinder select switch 140e shown in FIG. 3.

When the user slides the viewfinder select switch 140e to the OVF mode side, the microcomputer 110 is set to OVF mode. At this time, the microcomputer 110 controls the mirror driving portion 122 and the shutter driving portion 124, thereby putting the interior of the mirror box 120 into state A, as shown in FIG. 1. Through this, the user can view the subject image through the eyepiece 136 in real time. In addition, as mentioned earlier, autofocus operation utilizing the AF sensor 132 and photometric operation utilizing the AE sensor 133 are possible in state A.

Figure 7:
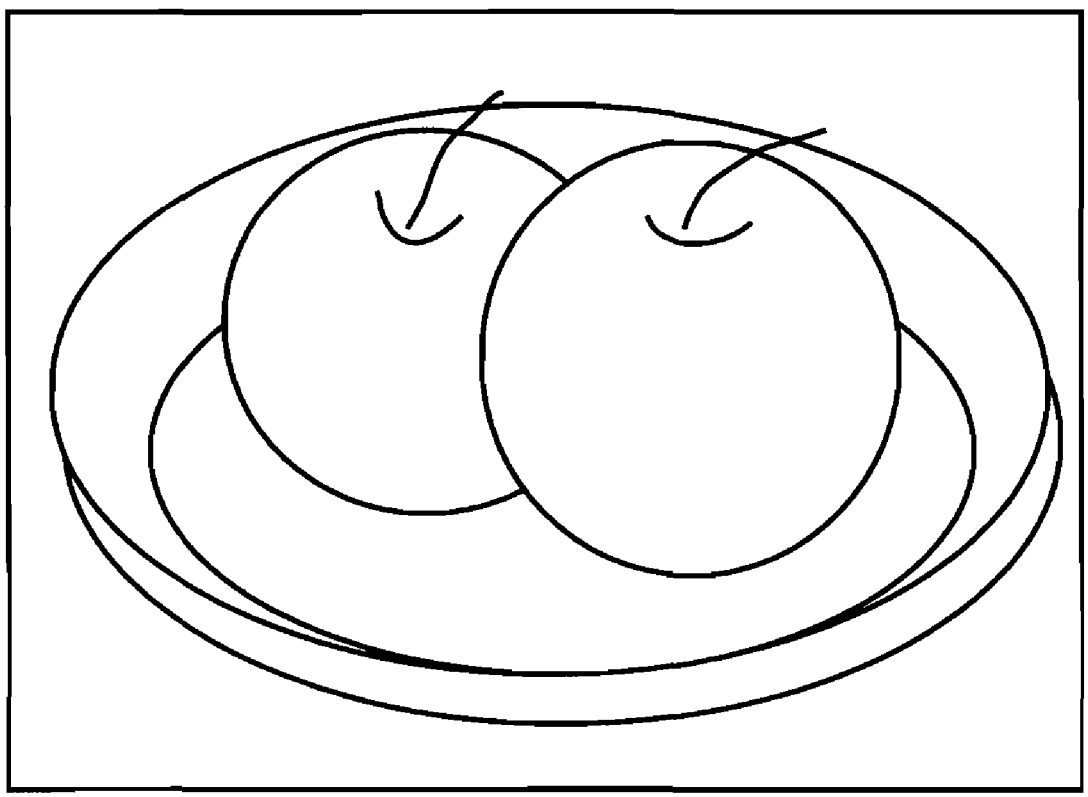
FIG. 7 is a schematic view showing an example of an image displayed while in OVF mode.

During OVF mode, the optical viewfinder only can display images in which the aspect ratio of the optical viewfinder is 4:3, as shown in FIG. 7. Also, as shall be mentioned later, the aspect ratio of the image data for recording is compulsorily set to 4:3 during OVF mode. Accordingly, it is possible to ensure that the aspect ratio of the image at the time of composition and the aspect ratio of the image recorded match, and thus it is possible to record an image compliant with the user's intent without providing an excess mechanism in the optical viewfinder.

[2-1-2. Operation During Use of the Liquid Crystal Monitor]

When the user slides the viewfinder select switch 140e to the live view mode side, from the OVF mode side, the microcomputer 110 is set to live view mode. At this time, the microcomputer 110 controls the mirror driving portion 122 and the shutter driving portion 124, thereby putting the interior of the mirror box 120 into state B, as shown in FIG. 5. Through this, the user can view the subject image through the liquid crystal monitor 150 in real time.

During real-time viewing, a subject image that has passed through the mirror box 120 and into the CMOS sensor 130 is converted into image data. That image data is inputted into the microcomputer 110 via the A/D converter 131; the microcomputer 110 performs predetermined processing on the image data.

Figure 8C:
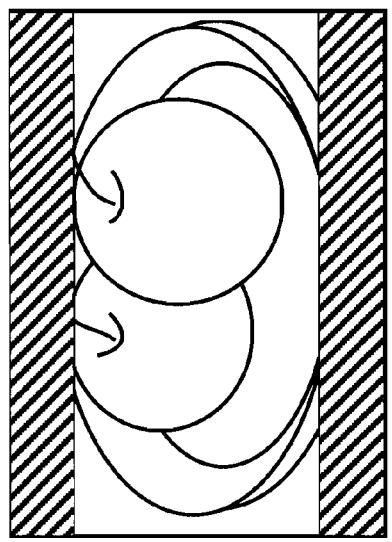
FIGS. 8A to 8C are a schematic view showing an example of images displayed while in live view mode.
Figure 8B:
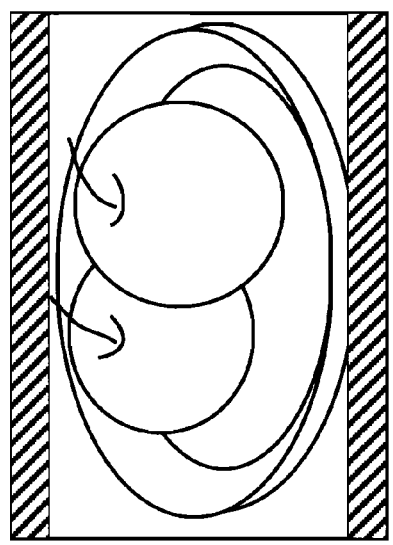
Figure 8A:
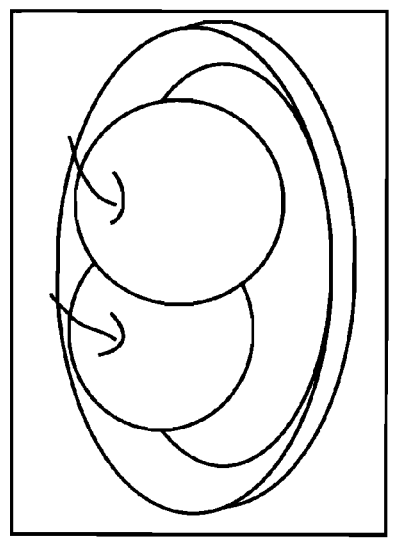

At this time, the microcomputer 110 processes the image data so that the aspect ratio of the image data becomes the same as the aspect ratio stored in the buffer 111. The image data processed in this manner is displayed in the liquid crystal monitor 150 as shown in FIGS. 8A to 8C. In other words, when the aspect ratio is set to 4:3, an image with an aspect ratio of 4:3, such as that shown in FIG. 8A, is displayed; when the aspect ratio is set to 3:2, an image with an aspect ratio of 3:2, such as that shown in FIG. 8B, is displayed; and when the aspect ratio is set to 16:9, an image with an aspect ratio of 16:9, such as that shown in FIG. 8C, is displayed.

In addition, when recording image data in live view mode, the microcomputer 110 processes the image data so that the aspect ratio of the image data becomes the same as the aspect ratio stored in the buffer 111. The image data then is stored in the memory card 300. In other words, when the aspect ratio is set to 4:3, the memory card 300 stores an image with an aspect ratio of 4:3, as shown in FIG. 8A; when the aspect ratio is set to 3:2, the memory card 300 stores an image with an aspect ratio of 3:2, as shown in FIG. 8B; and when the aspect ratio is set to 16:9, the memory card 300 stores an image with an aspect ratio of 16:9, as shown in FIG. 8C.

Accordingly, it is possible to ensure, even in live view mode, that the aspect ratio of the image at the time of composition and the aspect ratio of the image recorded match, and thus it is possible to record an image compliant with the user's intent without providing an excess mechanism in the optical viewfinder. Furthermore, in live view mode, it is possible to select an aspect ratio from among a plurality of aspect ratios and record the image so that it corresponds to the selected aspect ratio.

[2-2. Method for Setting the Aspect Ratio]

Figure 9:
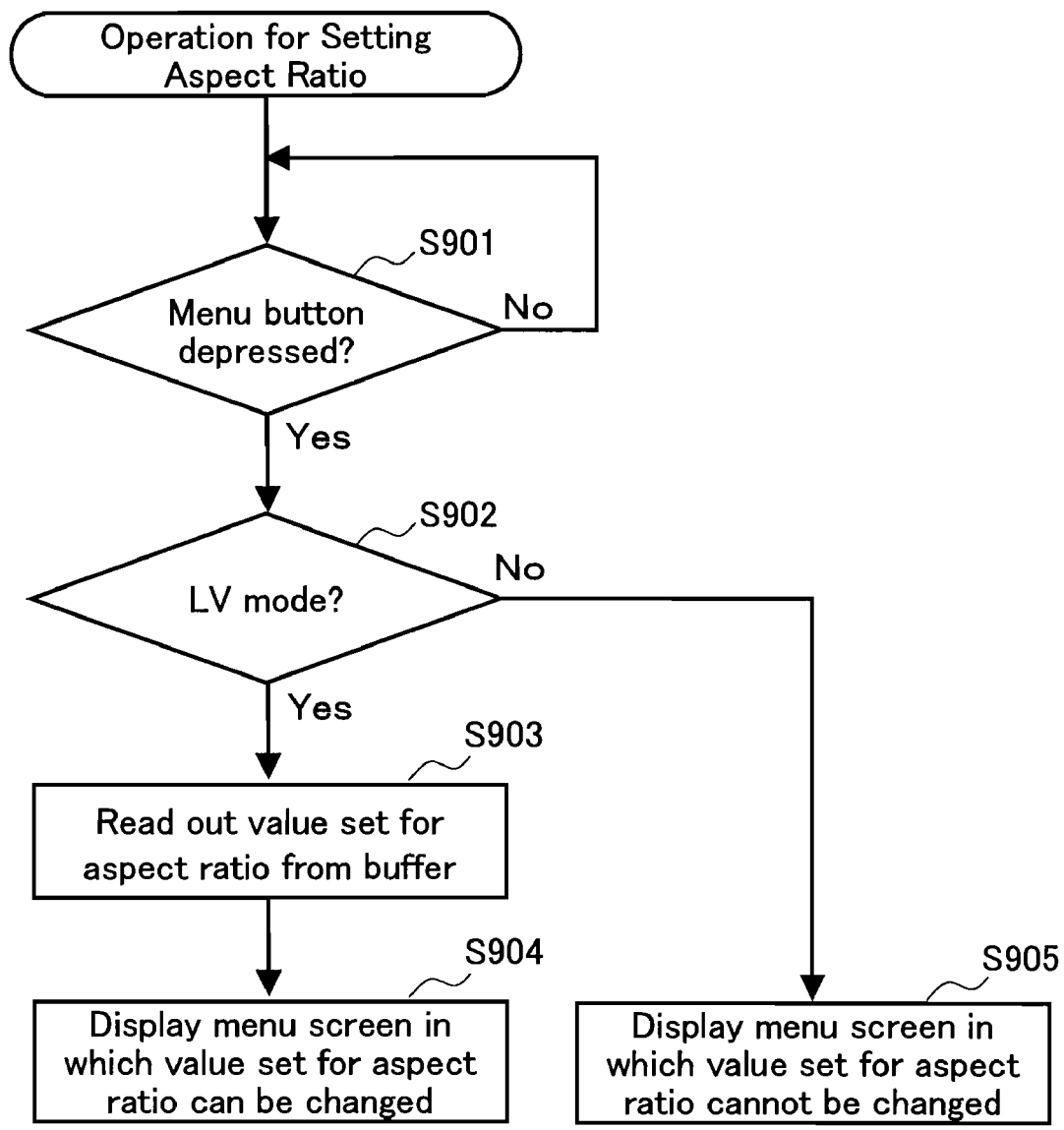
FIG. 9 is a flowchart illustrating a process for setting the aspect ratio.
Figure 10B:
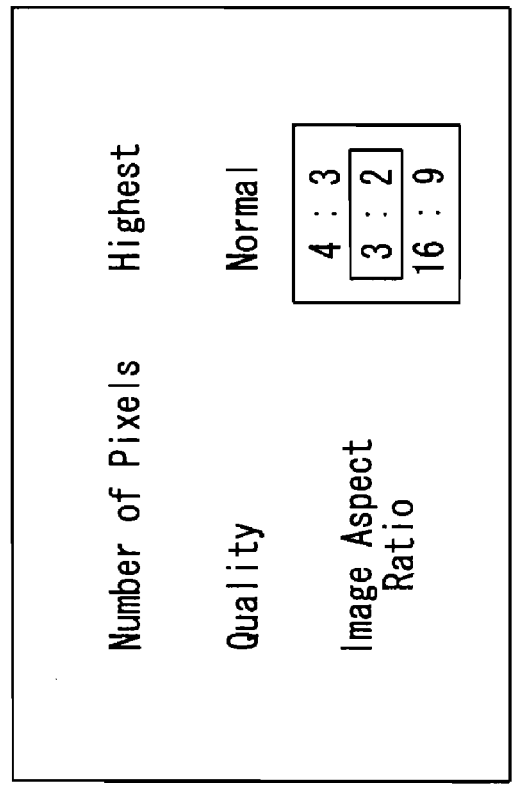
FIGS. 10A and 10B are a schematic view showing an example of a menu screen in live view mode.
Figure 10A:
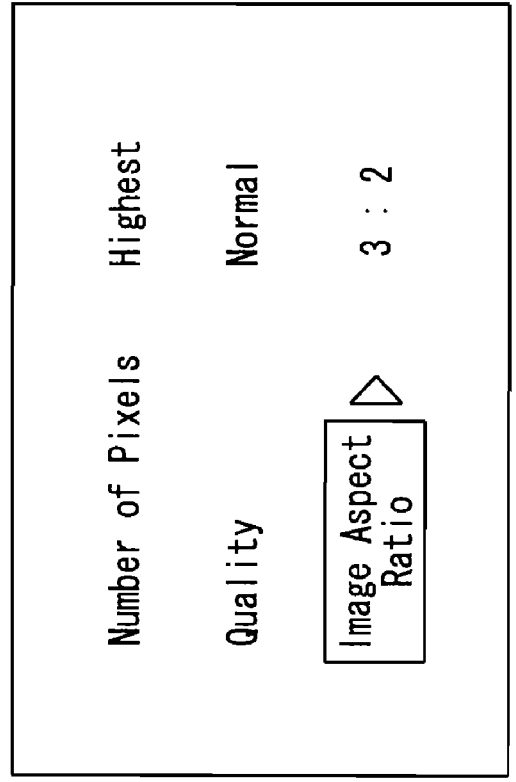
Figure 11:
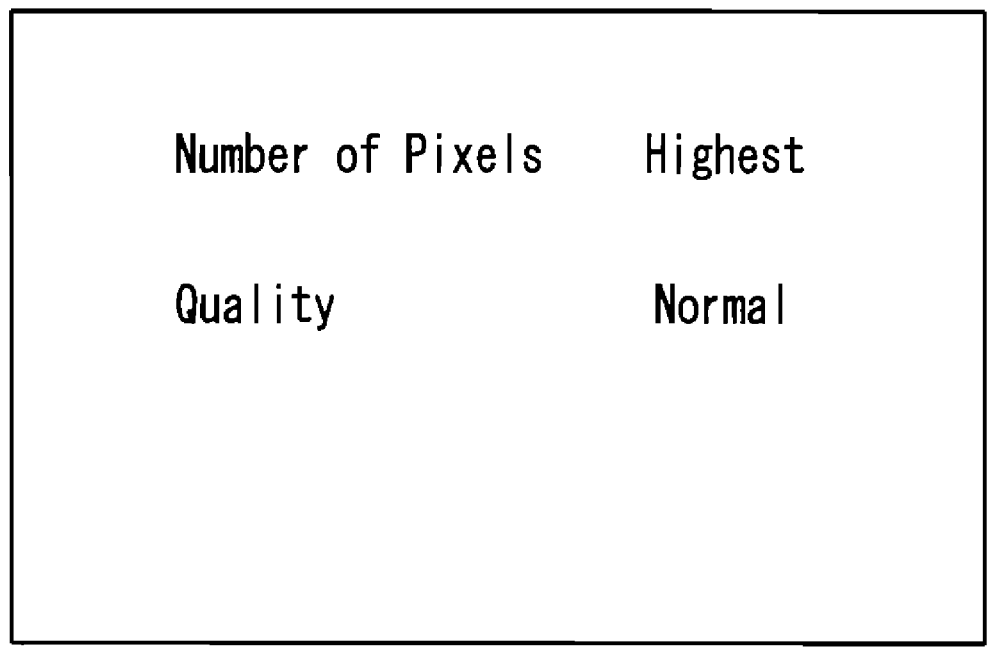
FIG. 11 is a schematic view showing an example of a menu screen in OVF mode.

A process for setting the aspect ratio of the image for recording shall be described hereafter with reference to FIGS. 9 to 11. FIG. 9 is a flowchart explaining a process for setting the aspect ratio of the image for recording. FIGS. 10A and 10B are a schematic view showing a menu screen in live view mode. FIG. 11 is a schematic view showing a menu screen in OVF mode.

In FIG. 9, when the user presses the menu button 140*a* (Yes, S901), the microcomputer 110 judges whether the currently-set mode is live view mode or OVF mode (S902).

When the results show that live view mode is currently set, the microcomputer 110 reads out the value set for the aspect ratio from the buffer 111 (S903). Here, the value set for the aspect ratio is assumed to be "3:2." Next, the microcomputer 110 reads out other data necessary for displaying the menu from the buffer 111, and displays the menu screen shown in FIG. 10A in the liquid crystal monitor 150. As can be seen in FIG. 10A, the microcomputer 110 displays the value of "3.2" read out from the buffer 111 in the menu screen (S904). The value set for the aspect ratio can be changed through user operations. To be more specific, when the user presses the up/down buttons of the directional pad 140*b* while the menu screen shown in FIG. 10A is being displayed by the liquid crystal monitor 150, the cursor displayed in the menu screen moves up/down, and thus it is possible to place the cursor on the "aspect ratio" item. When the cursor is placed on the "aspect ratio" item, the menu screen changes in the manner shown in FIG. 10B, and all values that can be set for the aspect ratio are displayed. The user then places the cursor on the aspect ratio s/he desires from among the aspect ratios displayed, and presses the set button 140*c*. Upon doing so, the aspect ratio is set to the user's desired aspect ratio, and the aspect ratio value in the buffer 111 is overwritten.

On the other hand, when in OVF mode, the microcomputer 110 displays the menu screen shown in FIG. 11 in the liquid crystal monitor 150 (S905). The "aspect ratio" item is not displayed in this menu screen from the beginning, and the value set for the aspect ratio cannot be changed.

In this manner, information regarding the aspect ratio stored within the buffer 111 can be changed only while in live view mode. In addition, as shall be described later, image data for recording is generated in accordance with the aspect ratio stored within the buffer 111 while in live view mode, whereas image data for recording is generated to have the same aspect ratio as the optical viewfinder regardless of the aspect ratio stored in the buffer 111 while in OVF mode. Accordingly, when moving from live view mode to viewfinder mode, it is possible to switch automatically from a state in which image data of an aspect ratio set by the user can be recorded to a state in which image data of the aspect ratio of the optical viewfinder can be recorded. Furthermore, when moving from viewfinder mode to live view mode, it is possible to switch automatically from a state in which image data of the aspect ratio of the optical viewfinder can recorded to a state in which image data of the aspect ratio set by the user before moving from live view mode to viewfinder mode can be recorded.

[2-3. Operations for Capturing an Image for Recording]

Next, operations for capturing an image for recording shall be explained with reference to FIGS. 12 to 14. Focusing systems used in capturing an image for recording include a manual focus system, a single focus system, and a continuous focus system; however, the manual focus system shall be used in the example shown hereafter. Note, though, that the present invention is applicable even if another focusing system is used.

The manual focus system is a system in which the focus changes in response to the user manipulating a focusing ring 262, whereby the focus can be set to the user's preference. However, the manual focus system has a problem in that bringing the subject into focus is difficult if the user is not accustomed to focusing the camera manually. Hereafter, descriptions shall be provided regarding the case of capturing an image using the optical viewfinder and the case of capturing an image using the liquid crystal monitor 150, with reference to FIGS. 12 and 14.

[2-3-1. Operations for Imaging Using the Optical Viewfinder]

Figure 12:
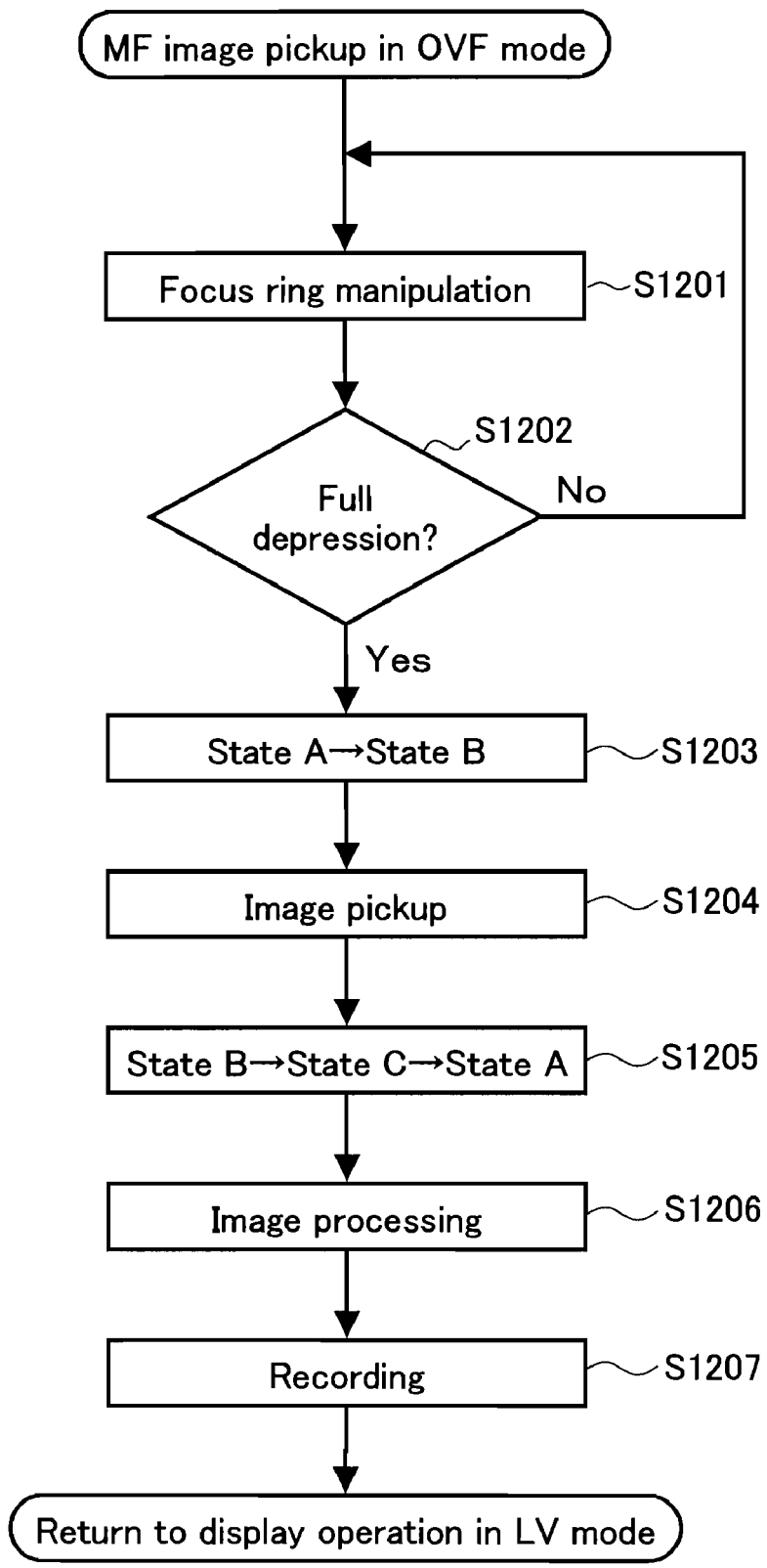
FIG. 12 is a flowchart illustrating a process occurring at the time of imaging using an optical viewfinder, while in manual focus mode.
Figure 13:
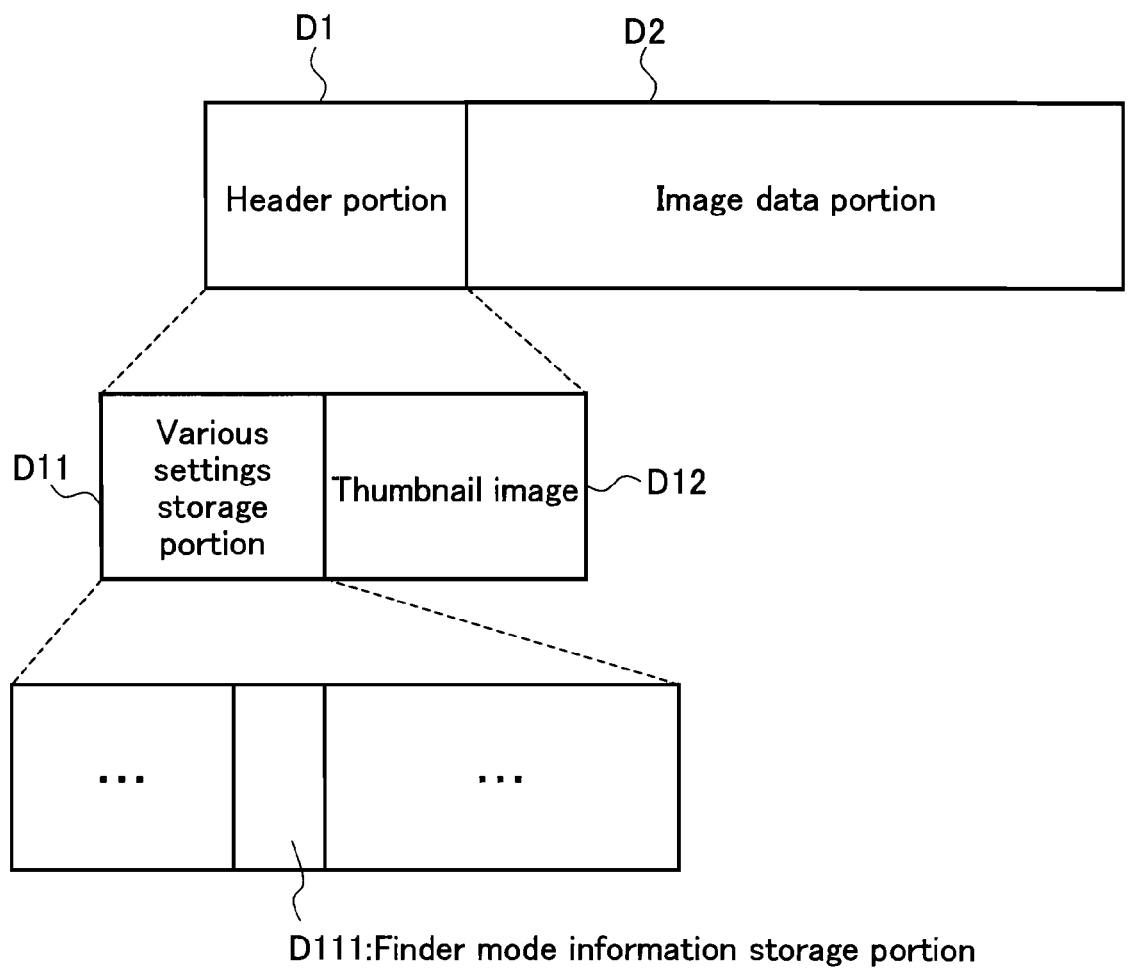
FIG. 13 is a schematic view showing the structure of an image file that contains an image for recording.

FIG. 12 is a flowchart illustrating a process occurring at the time of imaging using the optical viewfinder, while in manual focus mode.

In the case of imaging while in OVF mode, the interior of the mirror box 120 is in state A shown in FIG. 1. Prior to imaging, the user checks the subject image through the eyepiece 136, brings the subject into focus, and checks the composition. At this time, the aspect ratio of the subject image displayed in the optical viewfinder is 4:3. The user manipulates the focusing ring 262 to bring the subject into focus (S1201). In parallel with this, the microcomputer 110 monitors whether or not the release button 141 has been fully depressed (S1202).

In the case where the microcomputer 110 detects that the release button 141 has been fully depressed, the microcomputer 110 controls the mirror driving portion 122 and the shutter driving portion 124, thereby putting the interior of the mirror box 120 from state A into state B (S1203). In this state, the microcomputer 110 exposes the CMOS sensor 130 to the optical signal from the interchangeable lens 200, and causes an image for recording to be captured (S1204). Then, when the amount of time corresponding to the shutter speed has passed, the microcomputer 110 controls the shutter driving portion 124 to close the second shutter 123*b*, thereby ending the exposure (state C). After this, the microcomputer 110 returns the interior of the mirror box 120 to state A (S1205).

The microcomputer 110 takes the image data generated by the CMOS sensor 130 and temporarily stores the image data in the buffer 111. The image data stored at this time is, for example, image data composed of RGB components. The microcomputer 110 performs predetermined image processing on the image data stored in the buffer 111, such as YC conversion, resizing, compression, and the like, thereby generating image data for recording (S1206). At this time, the image data for recording is processed so as to have an aspect ratio of 4:3 regardless of the aspect ratio stored in the buffer 111. Finally, the microcomputer 110 generates an image file in, for example, the Exchangeable Image File Format (EXIF) standard. The microcomputer 110 stores the generated image file in the memory card 300 via the card slot 153.

Here, descriptions shall be provided regarding the image file that the microcomputer 110 ultimately generates. FIG. 13 is a schematic view showing the structure of this image file. The image file includes a header portion D1 and an image data portion D2. Image data for recording is stored in the image data portion D2. The header portion D1 includes a various settings storage portion D11 and a thumbnail image D12. The various settings storage portion D11 includes a plurality of storage areas in which various settings, including imaging conditions such as exposure conditions, white balance conditions, and imaging data, are stored. A finder mode information storage portion D111 is present in one of those storage areas. The finder mode information storage portion D111 stores either "LV" or "OVF" as information. When the microcomputer 110 performs imaging operations while live view mode is set, "LV" is stored in the finder mode information storage portion D111 of the image file generated as a result of the imaging. On the other hand, when the microcomputer 110 performs imaging operations while OVF mode is set, "OVF" is stored in the finder mode information storage portion D111 of the image file generated as a result of the imaging. Through this, whether the image data in the generated image file was generated in live view mode or in OVF mode can be determined easily by analyzing the header portion D1 of the image file. Through this, the user can understand the relationship between the quality of the image s/he took and the finder mode, which can be useful for improving his/her photographic technique.

In addition, the header portion D1 stores the number of vertical and horizontal pixels of the image data. Therefore, the aspect ratio of the image data can be determined easily by analyzing the header portion D1. However, information indicating the aspect ratio may be stored as well, in addition to or in place of the pixel numbers. This allows the aspect ratio of the image data to be determined more directly or easily.

[2-3-2. Operations for Imaging Using the Liquid Crystal Monitor]

Figure 14:
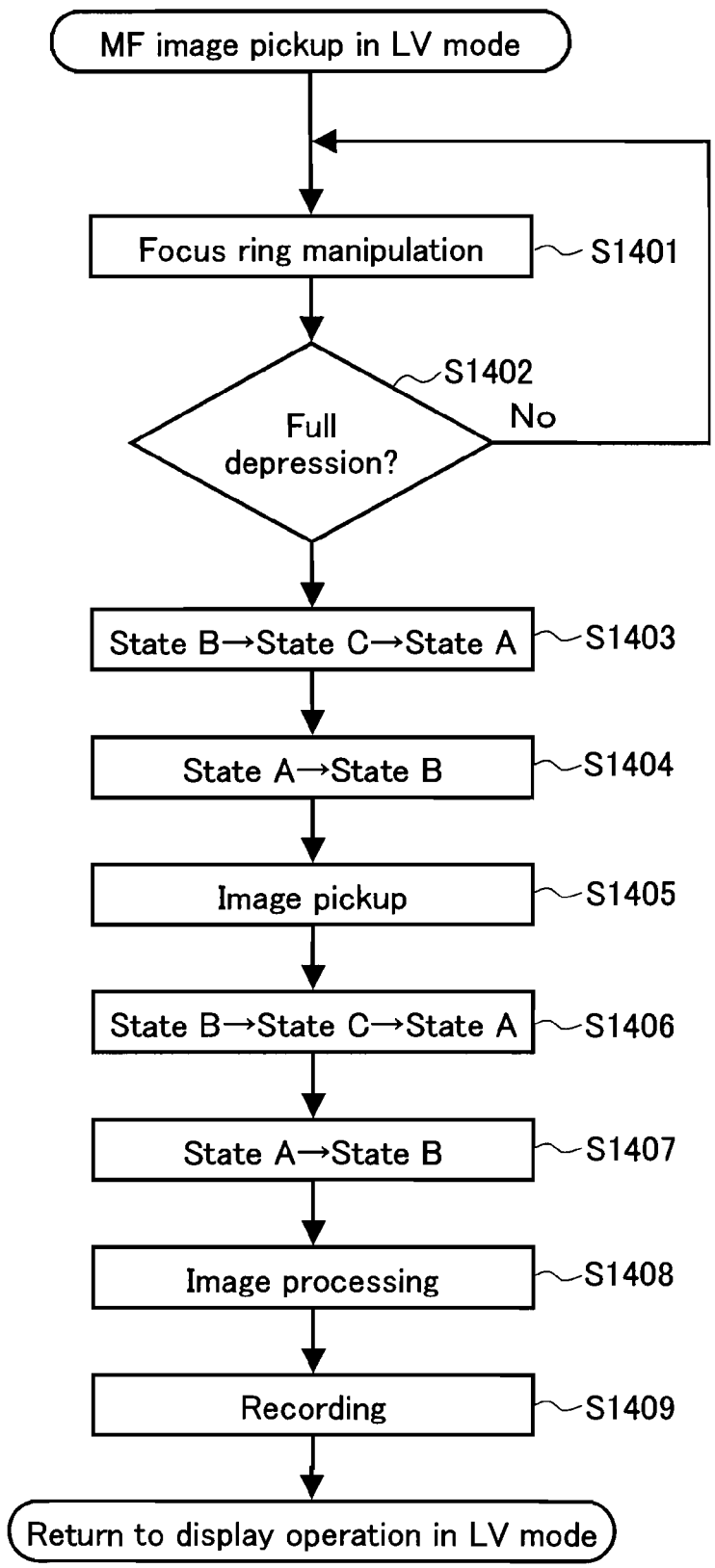
FIG. 14 is a flowchart illustrating a process occurring at the time of imaging using a liquid-crystal monitor 150, while in manual focus mode.

FIG. 14 is a flowchart explaining a process occurring at the time of imaging using a liquid-crystal monitor 150, while in manual focus mode.

In the case of imaging while in live view mode, the interior of the mirror box 120 is in state B shown in FIG. 1. Prior to imaging, the user checks the subject image through the liquid crystal monitor 150, brings the subject into focus, and checks the composition. At this time, the microcomputer 110 processes the image data received from the A/D converter 131 so that the aspect ratio of the image data becomes the same as the aspect ratio stored in the buffer 111, and displays image based on the image data in the liquid crystal monitor 150. The user manipulates the focusing ring 262 to bring the subject into focus (S1401). In parallel with this, the microcomputer 110 monitors whether or not the release button 141 has been depressed fully (S1402).

In the case where the microcomputer 110 detects that the release button 141 has been depressed fully, the microcomputer 110 controls the mirror driving portion 122 and the shutter driving portion 124, thereby putting the interior of the mirror box 120 from state B into state A via state C (S1403). The interior of the mirror box 120 is temporarily put into state A in this manner so as to temporarily interrupt, via the shutter 123, the optical signal inputted to the CMOS sensor 130, and allow the CMOS sensor 130 to prepare for exposure. The elimination of unnecessary electrical load in the pixels can be given as an example of preparation for exposure.

The processes indicated in steps S1404 to S1406 are identical to the processes indicated in the abovementioned steps S1203 to S1205, and thus descriptions thereof shall be omitted.

When exposure ends and the interior of the mirror box 120 reaches state A (S1406), the microcomputer 110 once again returns the interior of the mirror box 120 to state B, and resumes the live view display (S1407). In parallel with this, the microcomputer 110 takes the image data generated by the CMOS sensor 130 and temporarily stores the image data in the buffer 111.

The image data stored at this time is, for example, image data composed of RGB components. The microcomputer 110 performs predetermined image processing on the image data stored in the buffer 111, such as YC conversion, resizing, compression, and the like, thereby generating image data for recording (S1408). At this time, the image data for recording is processed so as to have the same aspect ratio as the aspect ratio stored in the buffer 111. The microcomputer 110 ultimately generates a file of, for example, the EXIF standard. The microcomputer 110 stores the generated image file in the memory card 300 via the card slot 153 (1409).

3. Conclusion

The digital camera 10 according to the present invention is a digital camera that has movable mirrors 121a and 121b, which are arranged so as to be able to advance into and withdraw from the optical path of the optical imaging system in order to conduct the subject image to the optical viewfinder. The digital camera 10 includes a CMOS sensor 130, a liquid crystal monitor 150, a microcomputer 110, an operation portion 140, and a card slot 153. The CMOS sensor 130 captures a subject image formed by an optical imaging system and generates image data. The liquid crystal monitor 150 displays image based on the generated image data or image based on the image data on which a predetermined processing has been performed. The microcomputer 110 has a live view mode, in which control is performed so that the generated image data or the image data on which the predetermined processing has been performed is displayed in the liquid crystal monitor 150 as a moving image in real time, and a viewfinder mode, in which control is performed so that the movable mirrors 121a and 121b conduct the subject image to an optical viewfinder. The operation portion 140 accepts instructions regarding the aspect ratio of the image. The recording portion configured of the microcomputer 110 and the card slot 153 performs a predetermined processing on the image data generated by the CMOS sensor 130 so that the image data takes on the aspect ratio accepted via the operation portion 140 while in live view mode, or performs a predetermined processing on the image data generated by the CMOS sensor 130 so that the image data takes on the aspect ratio of the optical viewfinder while in viewfinder mode; then, the image data is stored in the memory card 300.

Through this, it is possible, during live view mode, to store an image of an aspect ratio chosen by the user from among a plurality of aspect ratios. Because the aspect ratio of the image to be recorded is changed using image processing technology, this can be implemented without the need for a special configuration. On the other hand, during viewfinder mode, only an image of the aspect ratio of the optical viewfinder is stored, and thus the aspect ratio of the image displayed in the optical viewfinder and the aspect ratio of the image to be recorded can easily be made to match. Accordingly, it is possible to store an image of a composition that matches the user's intent using a simple system.

Therefore, according to the present embodiment of the invention, it is possible to provide a digital camera that can store images of a composition that matches the user's intent using a simple system, and can store images of an aspect ratio chosen by the user from among a plurality of aspect ratios.

In addition, in the present embodiment of the invention, the item "image aspect ratio", which is used to change the aspect ratio, is not displayed while in viewfinder mode. For this reason, the operation portion 140 does not accept instructions regarding the aspect ratio of the image while in viewfinder mode. Therefore, it is possible easily to alert the user that the aspect ratio cannot be changed during OVF mode. Furthermore, the value set for the aspect ratio during live view mode cannot be changed while in OVF mode, and thus it is possible, upon returning to live view mode, to record the image data using the previous settings.

In addition, in the present embodiment of the invention, the recording portion configured of the microcomputer 110 and the card slot 153 switches from a state in which image data with the aspect ratio accepted via the operation portion 140 can be recorded to a state in which image data with the aspect ratio of the optical viewfinder can be recorded, when the mode is switched from live view mode to viewfinder mode. Through this, it is possible to automatically match the aspect ratios of the displayed image and the recorded image, even without the user being aware that the matching has taken place.

In addition, in the present embodiment of the invention, the recording portion configured of the microcomputer 110 and the card slot 153 switches from a state in which image data with the aspect ratio of the optical viewfinder can be recorded to a state in which image data with the aspect ratio accepted via the operation portion 140 prior to the switch from live view mode to viewfinder mode, when the mode is switched from viewfinder mode to live view mode. Through this, the aspect ratio set in live view mode can be maintained when returning to live view mode from OVF mode, and therefore it is possible to prevent an aspect ratio switch the user does not intent to occur.

It should be noted that in the present embodiment of the invention, although the item "image aspect ratio", which is used to change the aspect ratio, is not displayed while in viewfinder mode, the present invention is not limited to such a configuration. For example, the "image aspect ratio" item may be displayed while in viewfinder mode as well, while the value set for the aspect ratio displayed therein simply cannot be changed. In other words, the operation portion 140 may be configured so as not to accept instructions regarding the aspect ratio of the image while in viewfinder mode.

The present invention is applicable to a digital camera that includes a movable mirror and with which a subject image can be viewed through an electronic viewfinder. For example, the present invention is applicable to a digital single-lens reflex camera. Moreover, the present invention is applicable not only to a camera that captures still images, but also to a camera that can capture moving images.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A digital camera having a movable mirror arranged so as to be able to advance into and withdraw from the optical path of an optical imaging system in order to conduct a subject image to an optical viewfinder, the digital camera comprising:
    an imaging element that captures a subject image formed by the optical imaging system and generates image data;
    a display portion that displays an image based on the image data generated by the imaging element or image data obtained by subjecting the image data generated by the imaging element to predetermined processing;
    a control portion having a live view mode, in which control is performed so that the image based on the image data generated by the imaging element or the image data obtained by subjecting the image data generated by the imaging element to the predetermined processing is displayed in the display portion in real time as a moving picture, and a viewfinder mode, in which control is performed so that the movable mirror conducts the subject image to the optical viewfinder;
    an aspect ratio accepting portion that accepts an instruction of selecting one of a plurality of aspect ratios regarding an aspect ratio of an image;
    wherein the control portion is operable to subject the image data generated by the imaging element to the predetermined processing so that the image data takes on the aspect ratio accepted by the aspect ratio accepting portion during the live view mode, display the moving picture based on the image data obtained by subjecting the image data generated by the imaging element to the predetermined processing in the display portion, and record the image data obtained by subjecting the image data generated by the imaging element to the predetermined processing on a storage medium.

2. The digital camera according to claim 1, wherein the aspect ratio accepting portion does not accept instructions regarding the aspect ratio of the image during the viewfinder mode.

3. The digital camera according to claim 1, wherein when the control portion moves from the live view mode to the viewfinder mode, the recording portion switches from a state in which image data of the aspect ratio accepted by the aspect ratio accepting portion is recordable to a state in which image data of the aspect ratio of the optical viewfinder is recordable.

4. The digital camera according to claim 3, wherein when the control portion moves from the viewfinder mode to the live view mode, the recording portion switches from a state in which image data of the aspect ratio of the optical viewfinder is recordable to a state in which image data of the aspect ratio accepted by the aspect ratio accepting portion before moving from the live view mode to the viewfinder mode is recordable.

* * * * *